US011125910B2

(12) United States Patent
Starr et al.

(10) Patent No.: US 11,125,910 B2
(45) Date of Patent: Sep. 21, 2021

(54) UNDERGROUND INFRASTRUCTURE SENSING USING UNMANNED AERIAL VEHICLE (UAV)

(71) Applicant: RedZone Robotics, Inc., Pittsburgh, PA (US)

(72) Inventors: Justin Starr, Baden, PA (US); Galin Konakchiev, Pittsburgh, PA (US); Foster J Salotti, Verona, PA (US); Mark Jordan, Pittsburgh, PA (US); Nate Alford, North Huntington, PA (US); Thorin Tobiassen, Pittsburgh, PA (US); Todd Kueny, Tarentum, PA (US); Jason Mizgorski, Gibsonia, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 202 days.

(21) Appl. No.: 16/184,054

(22) Filed: Nov. 8, 2018

(65) Prior Publication Data
US 2019/0137653 A1 May 9, 2019

Related U.S. Application Data

(60) Provisional application No. 62/583,689, filed on Nov. 9, 2017.

(51) Int. Cl.
*G01V 11/00* (2006.01)
*G05D 1/00* (2006.01)
(Continued)

(52) U.S. Cl.
CPC .......... *G01V 11/002* (2013.01); *B64C 39/024* (2013.01); *G01S 7/412* (2013.01);
(Continued)

(58) Field of Classification Search
CPC combination set(s) only.
See application file for complete search history.

(56) References Cited

U.S. PATENT DOCUMENTS 10,102,590 B1 * 10/2018 Farnsworth ............ G06Q 40/08
2015/0025788 A1 * 1/2015 Crain ........................ G01S 7/02
701/400

(Continued)

FOREIGN PATENT DOCUMENTS

| CN | 106202825 A | 7/2016 |
| CN | 106769163 A | 5/2017 |
| RU | 2656287 C1 | 6/2018 |

OTHER PUBLICATIONS

Gaysin, International Search Report and The Written Opinion of the International Searching Authority, PCT/US2018/059790, dated Mar. 21, 2019, Federal Institute of Industrial Property, Moscow, Russia (6 pages).

*Primary Examiner* — Mamadou L Diallo
(74) *Attorney, Agent, or Firm* — Cafardi, Ferguson, Wyrick, Wels & Gabriel, LLC; Andrew M. Gabriel

(57) ABSTRACT

One aspect provides a method, including: obtaining sensor data from an unmanned aerial vehicle (UAV); the sensor data comprising data obtained by one or more sensors of the UAV; analyzing, using a processor, the sensor data to detect underground water associated with a pipe; and identifying, with the processor, an underground feature based on the analyzing. Other aspects are described and claimed.

18 Claims, 5 Drawing Sheets

(51) Int. Cl.
  *G01V 8/02*   (2006.01)
  *G01S 13/88*  (2006.01)
  *B64C 39/02*  (2006.01)
  *G01S 7/41*   (2006.01)
  *G01S 13/90*  (2006.01)

(52) U.S. Cl.
  CPC .............. *G01S 13/885* (2013.01); *G01V 8/02* (2013.01); *G05D 1/0094* (2013.01); *B64C 2201/12* (2013.01); *G01S 13/90* (2013.01)

(56) References Cited

U.S. PATENT DOCUMENTS

| | | | |
|---|---|---|---|
| 2015/0331097 | A1 | 11/2015 | Hellsten |
| 2016/0169855 | A1* | 6/2016 | Baity ..................... G01N 33/24 47/58.1 SC |
| 2017/0045895 | A1 | 2/2017 | Wang |
| 2017/0108609 | A1* | 4/2017 | Haddy ................ G08G 5/0069 |
| 2018/0196438 | A1* | 7/2018 | Newlin ................ G03B 15/006 |

\* cited by examiner

UNDERGROUND INFRASTRUCTURE SENSING USING UNMANNED AERIAL VEHICLE (UAV)

CROSS REFERENCE TO RELATED APPLICATIONS

This application claims priority to U.S. Provisional Patent Application Ser. No. 62/583,689, having the same title and filed on Nov. 9, 2017, the contents of which are incorporated by reference in their entirety herein.

FIELD

The subject matter described herein relates to collection and use of sensor data for underground infrastructure, such as a pipe or pipe network, using an unmanned aerial vehicle (UAV).

BACKGROUND

Underground infrastructure such as pipe networks for municipalities that carry potable water, waste water, etc., need to be inspected and maintained. Pipes are often inspected as a matter of routine upkeep or in response to a noticed issue.

Various systems and methods exist to gather pipe inspection data. For example, pipe inspection data may be obtained by using closed circuit television (CCTV) cameras or via inspection using a mobile pipe inspection robot. Such methods are capable of traversing through a pipe with an inspection unit and obtaining data regarding the interior of the pipe, e.g., image and other sensor data for visualizing pipe features such as pipe defects, root intrusions, etc. Typically, an inspection crew is deployed to a location and individual pipe segments are inspected, often individually in a serial fashion, in order to collect pipe data and analyze it.

BRIEF SUMMARY

In summary, one aspect provides a method, comprising: obtaining sensor data from an unmanned aerial vehicle (UAV); the sensor data comprising data obtained by one or more sensors of the UAV; analyzing, using a processor, the sensor data to detect underground water associated with a pipe; and identifying, with the processor, an underground feature based on the analyzing.

Another aspect provides a system, comprising: an unmanned aerial vehicle (UAV), comprising: a motor coupled to a power source and a source of motion; a wireless communication module coupled to a processor and a memory; and one or more sensors coupled to the processor and the memory; the memory of the UAV storing code executable by the processor to: obtain sensor data with the one or more sensors; the one or more sensors being directed towards the ground; the sensor data representative of underground water associated with a pipe; and transmit the sensor data to a remote device.

A further aspect provides a product, comprising: a non-transitory storage device that stores code that is executable by a processor, the code comprising: code that obtains sensor data from an unmanned aerial vehicle (UAV); the sensor data comprising data obtained by one or more sensors of the UAV; code that analyzes the sensor data to detect underground water associated with a pipe; and code that identifies an underground feature based on the analyzing.

The foregoing is a summary and is not intended to be in any way limiting. For a better understanding of the example embodiments, reference can be made to the detailed description and the drawings. The scope of the invention is defined by the claims.

DETAILED DESCRIPTION

Figure 1:
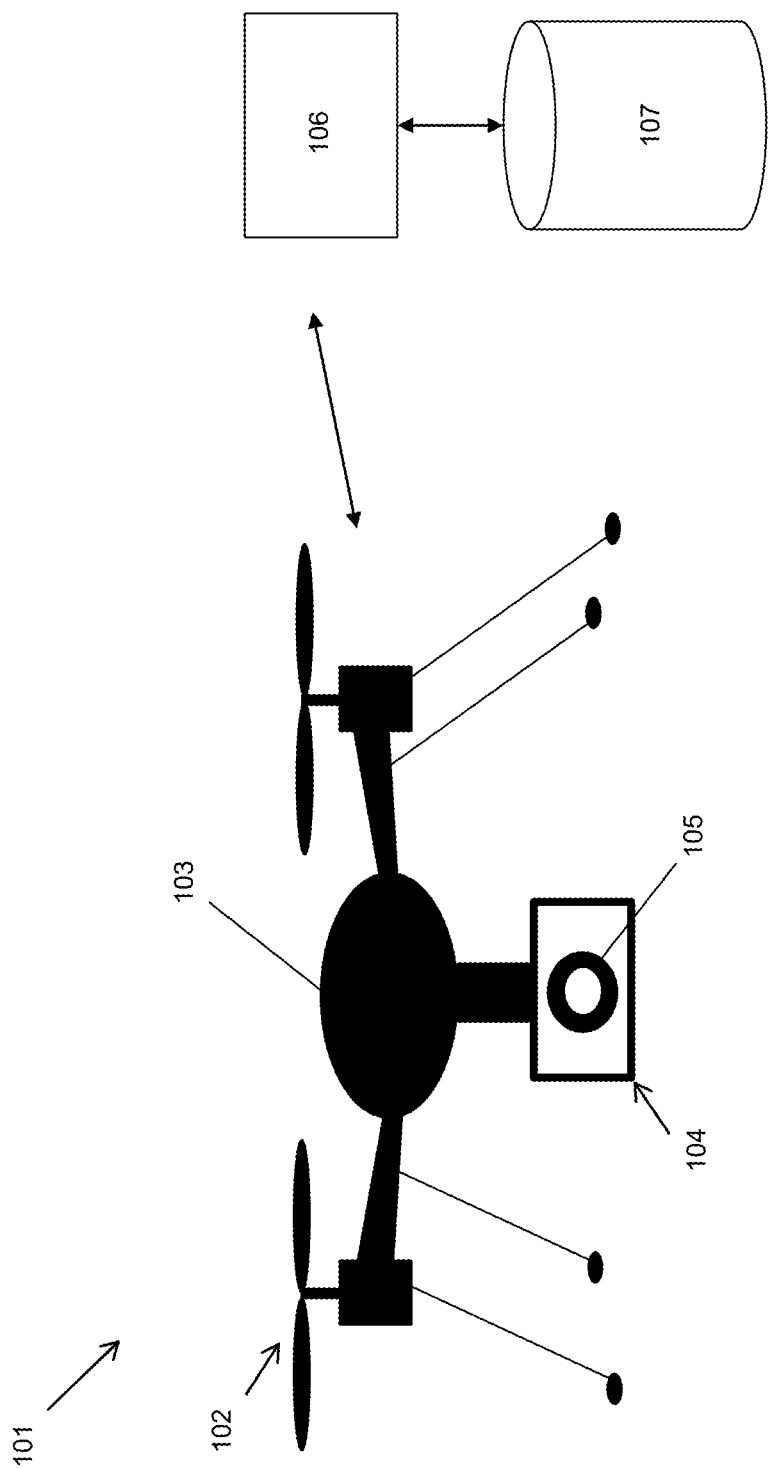
FIG. 1 illustrates an example system including an unmanned aerial vehicle (UAV) according to an embodiment.

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment(s)" (or the like) means that a particular described feature or characteristic is included in that example. This particular feature or characteristic may or may not be claimed. This particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described in detail to avoid obfuscation.

Because the inspection process for underground assets such as municipal water and sewer lines is quite labor intensive, costly and time consuming, it is important to identify assets that are the most in need of inspection in order to target these assets for prompt inspection and remediation processing. For example, a CCTV inspection crew may take several days to inspect a small pipe network in order to find a leaking pipe. Additionally, even with advances in robotics technology, mobile pipe inspection robots are limited in the speed at which the robot can traverse the interior of the pipe and provide pipe inspection data. Further, relying on human inspectors to analyze the pipe inspection data is also time consuming. It may take an extended amount of time for a human technician to review all of the pipe inspection data provided by a CCTV system or mobile pipe inspection robot. In addition, often the human technician will make judgement calls to categorize pipe features contained in the pipe data. For example, an experienced technician is often relied upon to categorize various types of pipe defects and classify them in terms of amount and degree (e.g., severity, need for repair, correlation with a known problem, etc.).

Accordingly, an embodiment provides for the collection and use of sensor data for underground infrastructure assets such as a pipe network using an unmanned aerial vehicle (UAV, also referred to as a "drone") as a collection mechanism. The use of a UAV for aerial sensing permits an analysis of larger sections of the pipe network to be completed quickly, e.g., to permit ground based inspection crews to identify pipe assets that are good targets for internal inspection.

In an embodiment, as the UAV scans an area of ground from above, it's sensor(s) collect data that may be utilized to identify underground feature(s), e.g., the location of a pipe, the presence of ground water or waste water pooling near a pipe, etc. The sensor data therefore may be used to identify and/or locate underground assets such as water and sewer pipes, and may further be used to characterize the composition of materials underground, e.g., the presence of waste water, ground water, etc. That is, the characteristics of the sensor data may be used to locate and/or identify these underground features, e.g., by comparison with reference data, such as known spectral or image features of a predetermined type. By way of example, reference data might include a file characterizing a pipe asset's spectral features when located at a known depth, in a known soil type, scanned with a known sensor type, from a known height above the ground. Similar data may be prepared for a reference data file regarding groundwater, waste water, and other materials, such that these may be distinguished from one another and unknown materials and features represented in the sensor data.

In an embodiment, the drone may include more than one sensor, i.e., a combination of sensors is used to collect sensor data. The sensors may be passive (e.g., a visible light camera that collects image data, passive terahertz sensor, etc.) or active (e.g., a sensor that transmits a signal and receives reflections of that signal, e.g., a radar unit, an infrared (IR) unit, a terahertz unit, etc.). Further, the drone may collect the sensor data for storage on-board, may analyze the sensor data on-board, may transmit the sensor data to a remote device for processing and analysis, or a combination of the foregoing might be used.

The description now turns to the figures. The illustrated example embodiments will be best understood by reference to the figures. The following description is intended only by way of example and simply illustrates certain selected example embodiments.

Referring now to FIG. 1, an example system including a UAV or drone 101 according to an embodiment is illustrated. As shown, UAV 101 is an aerial vehicle that has the ability to fly above the ground by remote control (e.g., wireless) operation. The UAV 101 includes a main chassis 103 that includes, for example, a circuit board having processor(s), memory, a wireless communication module, and connections to various other components of the UAV 101. By way of example, chassis 103 might include circuitry similar to that shown in FIG. 5, however this is a non-limiting example.

The UAV 101 chassis 103 is communicatively coupled to a control unit 106, which may take the form of a hand-held device that a human operator utilizes to communicate wirelessly with the UAV 101 to control its location, sensors, reporting, etc. The control unit 106 is also coupled to a remote device 107, e.g., a storage database for storing sensor images, or a workstation device or other computing device that is used for analysis of the sensor data, as further described herein.

The chassis 103 of UAV 101 is physically coupled to source(s) of motion, e.g., propeller(s) 102, which allows the UAV 101 to fly above the ground. Chassis 103 also includes a power source, e.g., a rechargeable battery, that is used to power various components, e.g., circuit board, sensors 104, propeller(s) 102, etc. Thus, the chassis 103 is communicatively coupled to various components for control of the UAV 101.

The UAV 101 is equipped with one or more sensors 105, for example housed in a main sensor unit 104. The type and number of sensors 105 utilized is variable, e.g., on the application, the UAV 101 platform available, etc. For example, the sensors 105 may include, but are not necessarily limited to, a terahertz sensor or unit, a radar unit, and an infrared imaging unit. Different sensor units 104 may be coupled to the UAV 101 for different missions. One or more of the sensors 105 is capable of providing data to detect and/or locate underground features, for example underground water such as waste water, ground water, etc. The capability to visualize underground features or characteristics does not limit the types of sensors 105 that may be included in an embodiment. For example, the sensors 105 may include a visual sensor such as a standard still or video camera in the sensor unit 104.

Figure 2:
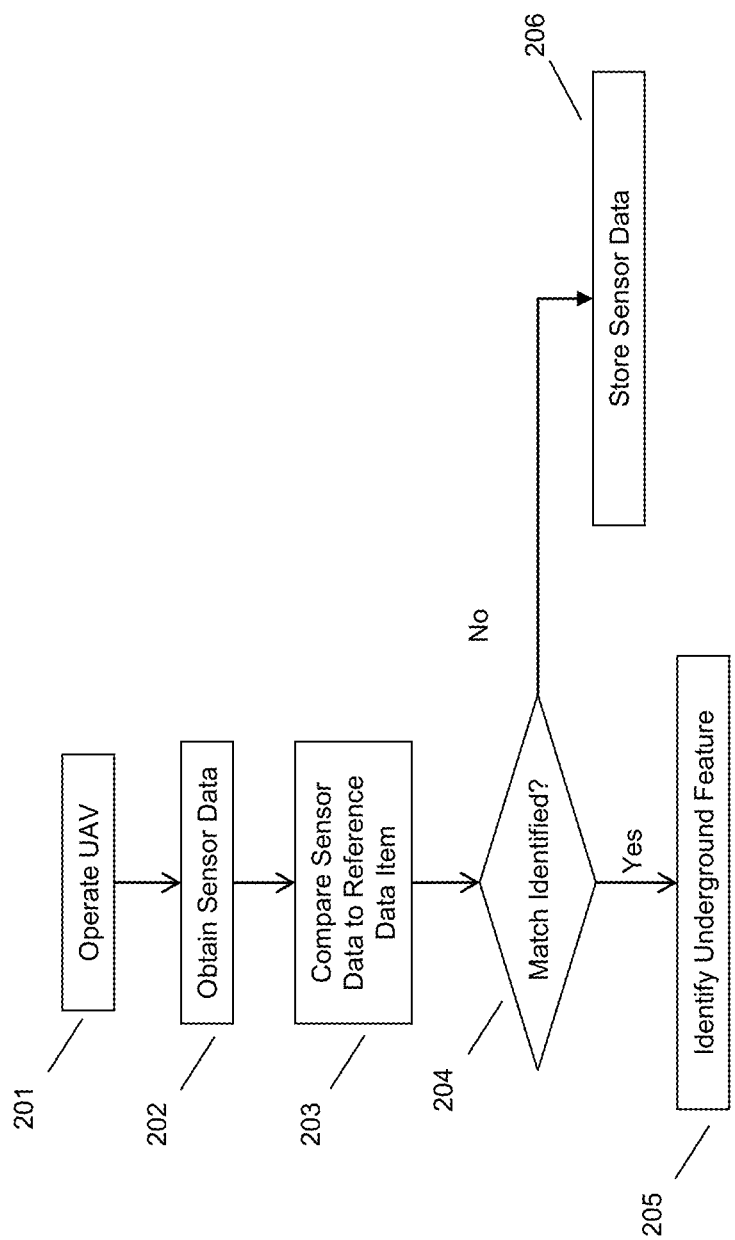
FIG. 2 illustrates an example method of identifying an underground feature according to an embodiment.

An embodiment is capable of detecting underground water associated with a pipe, e.g., waste water, ground water, etc. For example, and referring to FIG. 2, an embodiment includes a method in which an operator operates a UAV, as illustrated at 201, and obtains sensor data 202 as the UAV flies above the ground, beneath which a pipe or set/network of pipes is located. Because the pipe(s) are subterranean, e.g., located beneath the surface of the ground, standard cameras or video imaging devices will not be capable of locating the pipes themselves, much less any leaks of water (or other material) associated therewith, particularly if the leak is small and contained beneath the surface of the ground without causing visual surface effects.

However, an embodiment is nonetheless capable of obtaining sensor data at 202 that includes data regarding subterranean features. For example, if sensor unit 104 of FIG. 1 includes a ground penetrating radar unit as a sensor 105, the sensor data will include a trace that can be formed into a scan for use in detecting underground features, e.g., the locations of pipes, the location of water beneath the surface, the location of a likely exit point for the water from a pipe (in the case of a leak), etc. Likewise, the sensor data obtained at 202 may include other data regarding subterranean features. For example, if sensor unit 104 of FIG. 1 includes a terahertz imaging unit as a sensor 105, the sensor data will include terahertz data (e.g., reflection data), that may similarly be converted into an image for detecting underground features. Further, spectral data of the sensor data may be utilized to conduct a material identification for materials that are underground.

As such, after collecting the sensor data at 202, an embodiment compares that sensor data (or converted/transformed data derived from the sensor data) to a reference data item. For example, an embodiment may utilize a reference data item such as a known terahertz spectrum for ground water and waste water to determine if the sensor data is indicative of either ground water or waste water, or some other material (known or unknown). The reference data items may be stored in the form of data files, to which the sensor data files are compared. The comparison may include any of a number or type of feature comparisons. For example, the comparison may extract certain features from the sensor data and the reference data item in order to compare feature values. By way of example, return reflections from an active transmission radar unit may be stored in the form of a scan file that has a plurality of features, e.g., amplitude of reflections, that are compared to a scan file of a known item, e.g., a pipe that is leaking waste water into a pooling area underneath the ground. This permits an automated detection of like features and an automated identification of a candidate feature.

Thus, the comparison at 203 might include the identification of a best matching reference data item, identified at 204, which is then returned as the identified underground feature at 205. This may be a coarsely defined determination. That is, the output at 205 might simply conclude that waste water and not ground water is identified in the sensor data, and nothing more. However, more refined output may be provided at 205, as further described herein. In some cases, the coarsely defined output may be improved with further analysis of the same sensor data and/or other sensor data. For example, the detection of waste water using a terahertz sensor or radar data might be supplemented with location data, e.g., obtained with a GPS unit and/or correlating features of a terahertz image or radar scan with a visual image and/or map data. When no match can be found, the sensor data may simply be stored at 206, e.g., for visual analysis by a technician at a later point in time.

Figure 3:
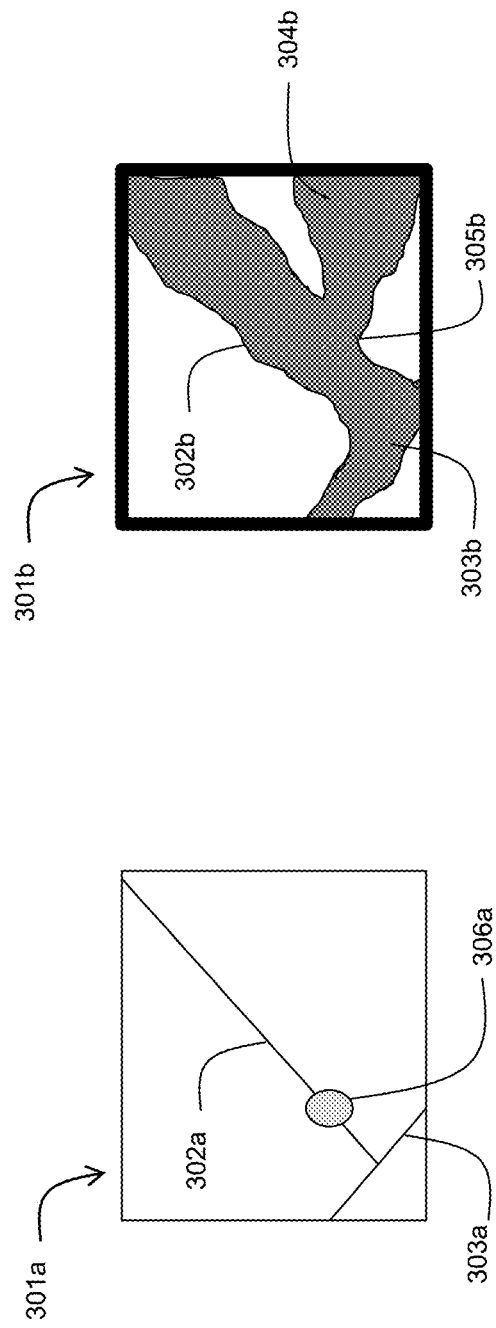
FIG. 3(A-B) illustrates example images according to an embodiment.

Turning to FIG. 3(A-B), example images are illustrated. In FIG. 3A, an example output that might be produced at step 205 is illustrated. FIG. 3B on the other hand illustrates an example of sensor data that may be obtained at step 202 and used to form the output at 205, as explained by the following, non-limiting example.

In FIG. 3A, the image 301a includes image data formed using visual elements that are created, e.g., it is a map image that includes map data that is produced by a mapping application, as opposed to being a raw image or an image formed directly from sensor data (such as shown in FIG. 3B). The image 301a may be formed, for example, using (in part) existing, known map data, for example stylized map data for an existing pipe network. The image 301a for example includes two pipes 302a, 303a, that are connected to one another at a junction. This map data may be created in a separate process, as will be appreciated by those of ordinary skill in the art.

The image 301a includes an additional annotation or feature 306a, i.e., a suspected location of a waste water leak. This feature is provided by an embodiment based on analysis of the sensor data collected by the UAV 101.

For example, image 301b is sensor image data that is collected by one or more sensors 105 of the UAV 101. By way of non-limiting example, the sensor image 301b might be formed from data collected by a radar unit, where the image 301b is in the form of a scan, with amplitudes of reflections represented by color or amount of shading (in the case of a black and white image). Thus, subterranean features may be identified, e.g., by performing additional image analysis on the image 301b derived from the sensor data.

As illustrated, image 301b includes course level features 302b, 303b that roughly correspond to the known locations of pipes 302a, 302b. Additionally, image 301b includes the feature 304b, e.g., waste water that has pooled next to feature 302b (corresponding to pipe 302a). From this, an automated determination may be made, e.g., a conclusion drawn that feature 304b is associated with pipe 302a and not with pipe 303a. Moreover, by analyzing the map data of image 301a, it can be determined that feature 304b is not a pipe, but is rather another underground feature, e.g., water. Even without identifying the actual character of feature 304b (i.e., that it is waste water as opposed to ground water, a different soil, etc.), the image 301b is valuable for locating a pipe (or pipe segment) of interest for further inspection by a ground crew, in this case because of its correlation with feature 304b. As such, an embodiment provides a convenient mechanism to rapidly identify pipes that have associated subterranean or underground features of interest that might warrant further analysis or inspection.

As described herein, feature 304b may be characterized to identify its characteristic(s). For example, spectral data might be utilized to conclude that the feature 304b is likely (e.g., within a confidence threshold) waste water exiting from pipe 302a, rather than natural ground water pooling in the area of feature 304b. As will be appreciated by those having skill in the art, comparison of spectral features from sensor data may be used, e.g., in comparison with known spectral features for material of interest, to determine that feature 304b is likely to be waste water as opposed to ground water. However, it should be noted that this is not the only way such a determination might be conducted. For example, and embodiment may apply another technique, e.g., machine learning or the like, to conclude that feature 304b is associated with waste water rather than ground water. For example, an embodiment may determine that feature 304b is waste water by consulting additional, non-sensor data, for example data indicating that both pipes 302a and 303a are waste water pipes. By training a system to analyze multiple data types to make conclusions, such determinations may be quite accurate in supplying a confident conjecture as to the nature or source of features, e.g., feature 304b.

An embodiment further permits the annotation 306a to be added to standard map data (or other graphic, image, etc.), as illustrated in FIG. 3A. This annotation 306a may be derived automatically from image 301b, e.g., determining that area 305b is a likely exit point for waste water from pipe 302a. Thus, an embodiment may locate, e.g., via analysis of image 301b, derived from the sensor data, that an area of pipe 302a is of particular interest. This may assist a user reviewing the image 301b in identifying a location within the map data of image 301a, e.g., identifying a location within the pipe network that is of particular interest.

An embodiment identifies the material characteristic of features such as feature 304b, in addition to or as an alternative to identifying its location and correlating it with map data. For example, an embodiment employing a sensor that is capable of distinguishing between known materials, e.g., waste water, ground water, soil, rock, etc., for example a terahertz sensor, is capable of providing this information, e.g., as part of annotation 306a or otherwise (e.g., text communication, etc.). An embodiment facilitates this process by utilizing reference data items, e.g., stored spectra of known materials, and comparing the spectral features of the sensor data to this reference data item. By way of specific example, a waste water detection algorithm can be applied that includes identification of the part of the sensor data of interest, e.g., as for example represented by 304a in image form, with a known standard, e.g., spectral qualities of a terahertz image of subterranean or underground waste water, in order to make a binary decision as to whether feature 304b is likely (e.g., within a predetermined threshold) to be wastewater or another feature, known or unknown. It will be readily understood by those having ordinary skill in the art that this may require the reference data item(s) to be prepared in advance, e.g., through testing the various detection scenarios of interest, e.g., with a similar UAV beforehand.

Figure 4:
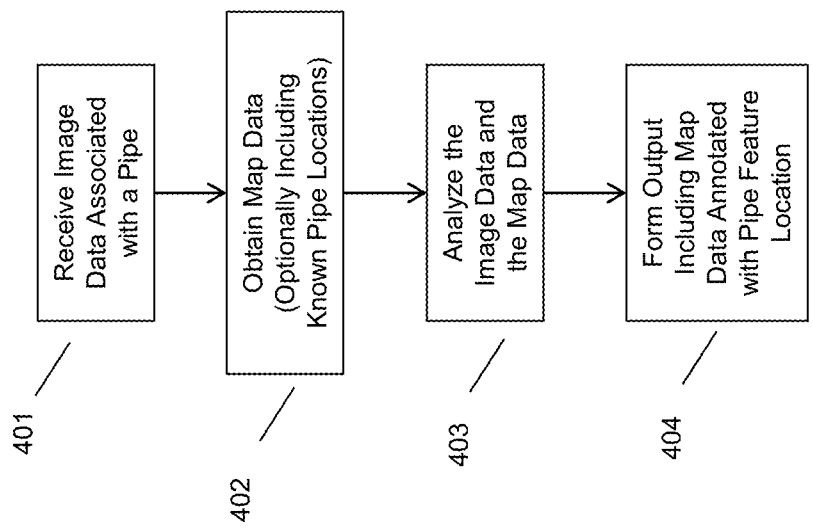
FIG. 4 illustrates an example method of locating an underground feature according to an embodiment.

Referring now to FIG. 4, an embodiment provides a method of locating an underground feature according to an embodiment. As shown, image data associated with pipe is received at 401, e.g., for example image data like that of image 301*b* of FIG. 3B. Map data, e.g., for example map data like that of image 301*a* of FIG. 3A, is obtained at 402, which optionally includes known or suspected pipe locations. The image data and the map data is analyzed at 403 in order to identify an underground feature of interest, e.g., an exit point of waste water, a location of ground water, etc., and form an annotation regarding this underground feature. As explained in connection with FIG. 3(A-B), the output formed at 404 may include a map image that is annotated with a pipe feature location, e.g., similar to annotation 306*a*.

An embodiment therefore represents a technical improvement in the detection of underground features in connection with UAV imaging. For example, an embodiment makes possible the use of sensor data collected by a UAV to automatically detect areas where underground water is associated with a pipe of interest. This further permits human users to quickly identify locations within the pipe network that are of interest, e.g., for additional inspection, maintenance activities, or the like. Further, an embodiment makes it possible to characterize the underground water, e.g., as waste water versus ground water, also using the sensor data to automatically identify such features.

Figure 5:
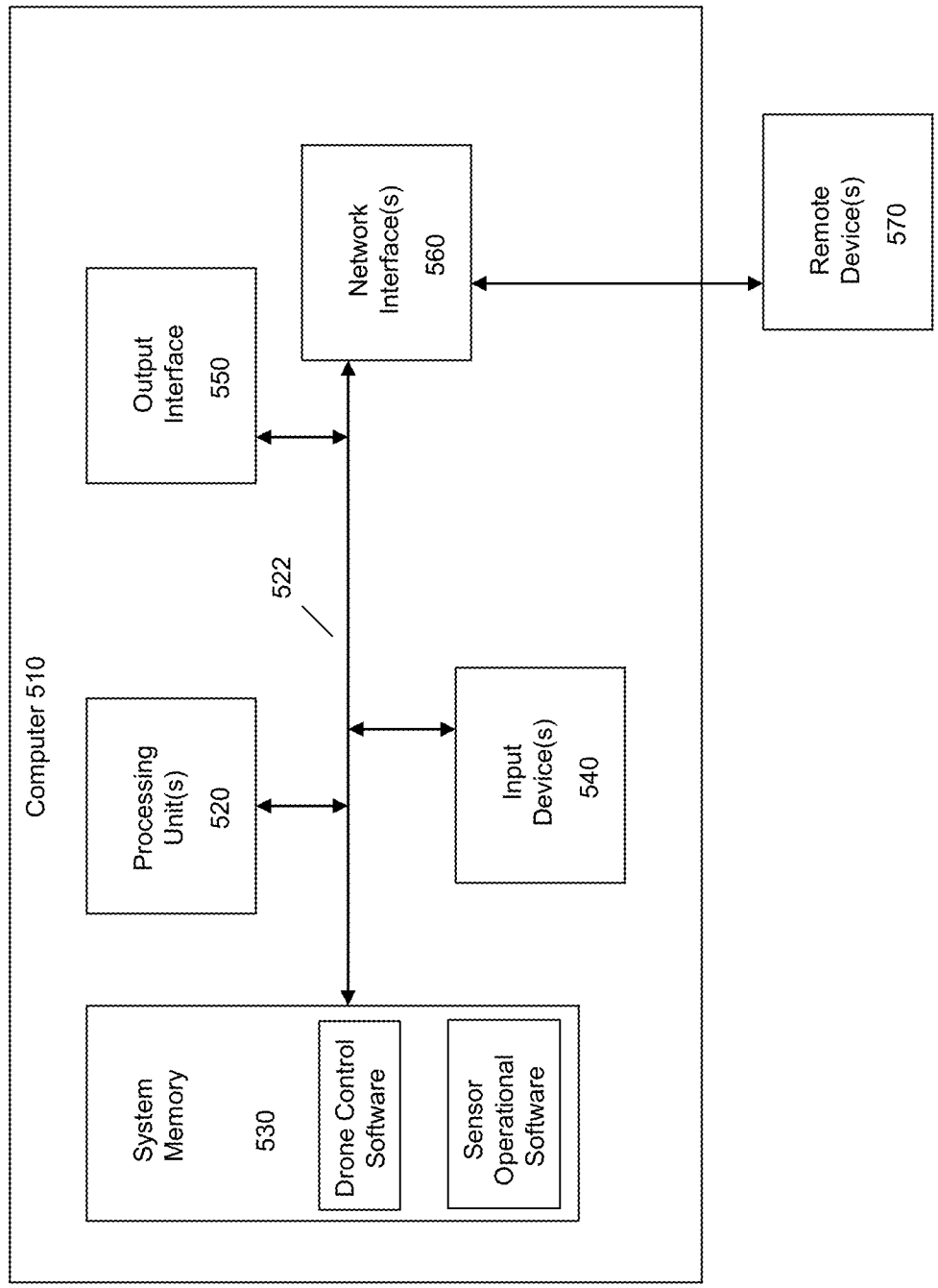
FIG. 5 illustrates an example computing device according to an embodiment.

It will be readily understood that certain embodiments can be implemented using any of a wide variety of devices or combinations of devices. Referring to FIG. 5, an example device that may be used in implementing one or more embodiments includes a computing device (computer) 510, for example included in a UAV 101 and/or a computer system (e.g., control unit 106 or remote device 107).

The computer 510 may execute program instructions or code configured to store and analyze sensor data and perform other functionality of the embodiments, as described herein. Components of computer 510 may include, but are not limited to, a processing unit 520, a system memory 530, and a system bus 522 that couples various system components including the system memory 530 to the processing unit 520. The computer 510 may include or have access to a variety of non-transitory computer readable media. The system memory 530 may include non-transitory computer readable storage media in the form of volatile and/or non-volatile memory devices such as read only memory (ROM) and/or random access memory (RAM). By way of example, and not limitation, system memory 530 may also include an operating system, application programs, other program modules, and program data. For example, system memory 530 may include application programs such as drone control software and/or sensor operational software. Data may be transmitted by wired or wireless communication, e.g., from UAV 101 to another computing device, e.g., control unit 106, remote device, 107, etc., independently, as part of the sensor data, or a combination of the foregoing.

A user can interface with (for example, enter commands and information) the computer 510 through input devices 540 such as a touch screen, keypad, etc. A monitor or other type of display screen or device can also be connected to the system bus 522 via an interface, such as interface 550. The computer 510 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining sensor data from an unmanned aerial vehicle (UAV);
   the sensor data comprising data obtained by one or more sensors of the UAV;
   analyzing, using a processor, the sensor data to detect underground water associated with a pipe;
   identifying, with the processor, an underground pipe feature based on the analyzing;
   associating a position of the underground pipe feature with a location in a pipe network;
   selecting a subset of the pipe network including a pipe segment associated with the position of the underground pipe feature; and
   providing the subset of the pipe network as displayable data to a display device.

2. The method of claim 1, wherein the underground pipe feature is one or more of: a pipe associated with underground water, a pipe area associated with the underground water, and a type of the underground water.

3. The method of claim 1, comprising:
   obtaining map data; and
   associating a location of the underground pipe feature with the map data.

4. The method of claim 1, wherein the sensor data comprises reflections received in response to transmissions by one or more sensors of the UAV, and wherein the analyzing comprises comparing the reflections received in response to transmissions by one or more sensors of the UAV to reference data.

5. The method of claim 4, wherein the comparing comprises identifying that a reference data item that matches the reflections received in response to transmissions by one or more sensors of the UAV.

6. The method of claim 5, wherein the identifying that a reference data item matches the reflections received in response to transmissions by one or more sensors of the UAV comprises comparing spectral features of the reflections to spectral features of the reference data item.

7. The method of claim 5, wherein the reference data item comprises standard features prepared in advance of the obtaining of sensor data from the UAV.

8. The method of claim 1, comprising operating the UAV to obtain the sensor data.

9. The method of claim 8, comprising transmitting the sensor data to a remote device.

10. The method of claim 9, wherein the analyzing and identifying are performed by the remote device.

11. A system, comprising:
    an unmanned aerial vehicle (UAV), comprising:
    a motor coupled to a power source and a source of motion;
    a wireless communication module coupled to a processor and a memory; and
    one or more sensors coupled to the processor and the memory; the memory of the UAV storing code executable by the processor to:
    obtain sensor data with the one or more sensors;
    the one or more sensors being directed towards the ground;
    the sensor data representative of underground water associated with a pipe; and
    transmit the sensor data to a remote device; and
    a remote device being configured to:
    analyze the sensor data to detect the underground water associated with a pipe;
    identify a location of an underground pipe feature based on the analysis of the sensor data;
    associate a position of the underground pipe feature with a location in a pipe network;
    select a subset of the pipe network including a pipe segment associated with the position of the underground pipe feature; and
    provide the subset of the pipe network as displayable data to a display device.

12. The system of claim 11, wherein a sensor of the one or more sensors is a synthetic aperture radar unit, a ground penetrating radar unit, or a terahertz imaging unit.

13. The system of claim 11, wherein the underground pipe feature is one or more of: a pipe associated with underground water, a pipe area associated with the underground water, and a type of the underground water.

14. The system of claim 11, wherein the sensor data comprises reflections received in response to transmissions by one or more sensors of the UAV, and wherein the remote device compares the reflections received in response to transmissions by one or more sensors of the UAV to reference data.

15. The system of claim 14, wherein the remote device identifies that a reference data item matches the reflections received in response to transmissions by one or more sensors of the UAV.

16. The system of claim 15, wherein the remote device compares spectral features of the reflections to spectral features of the reference data item.

17. The system of claim 15, wherein the reference data item comprises standard features prepared in advance of the obtaining of sensor data from the UAV.

18. A product, comprising:
    a non-transitory storage device that stores code that is executable by a processor, the code comprising:
    code that obtains sensor data from an unmanned aerial vehicle (UAV);
    the sensor data comprising data obtained by one or more sensors of the UAV;
    code that analyzes the sensor data to detect underground water associated with a
    pipe;
    code that identifies an underground pipe feature based on the sensor data;
    code that associates a position of the underground pipe feature with a location in a pipe network;
    code that selects a subset of the pipe network including a pipe segment associated with the position of the underground pipe feature; and
    code that provides the subset of the pipe network as displayable data to a display device.

* * * * *